United States Patent Office 3,478,964
Patented Nov. 18, 1969

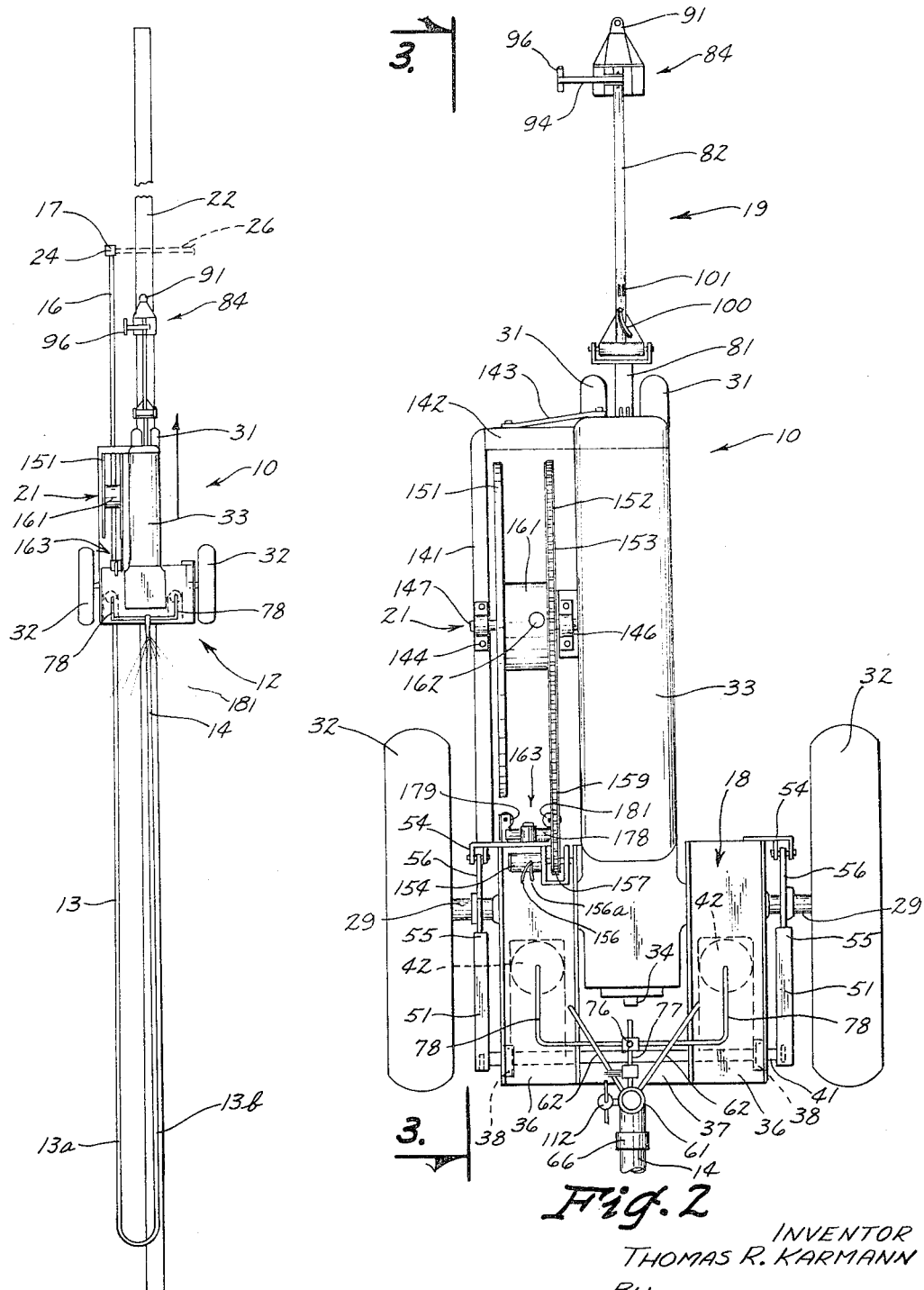

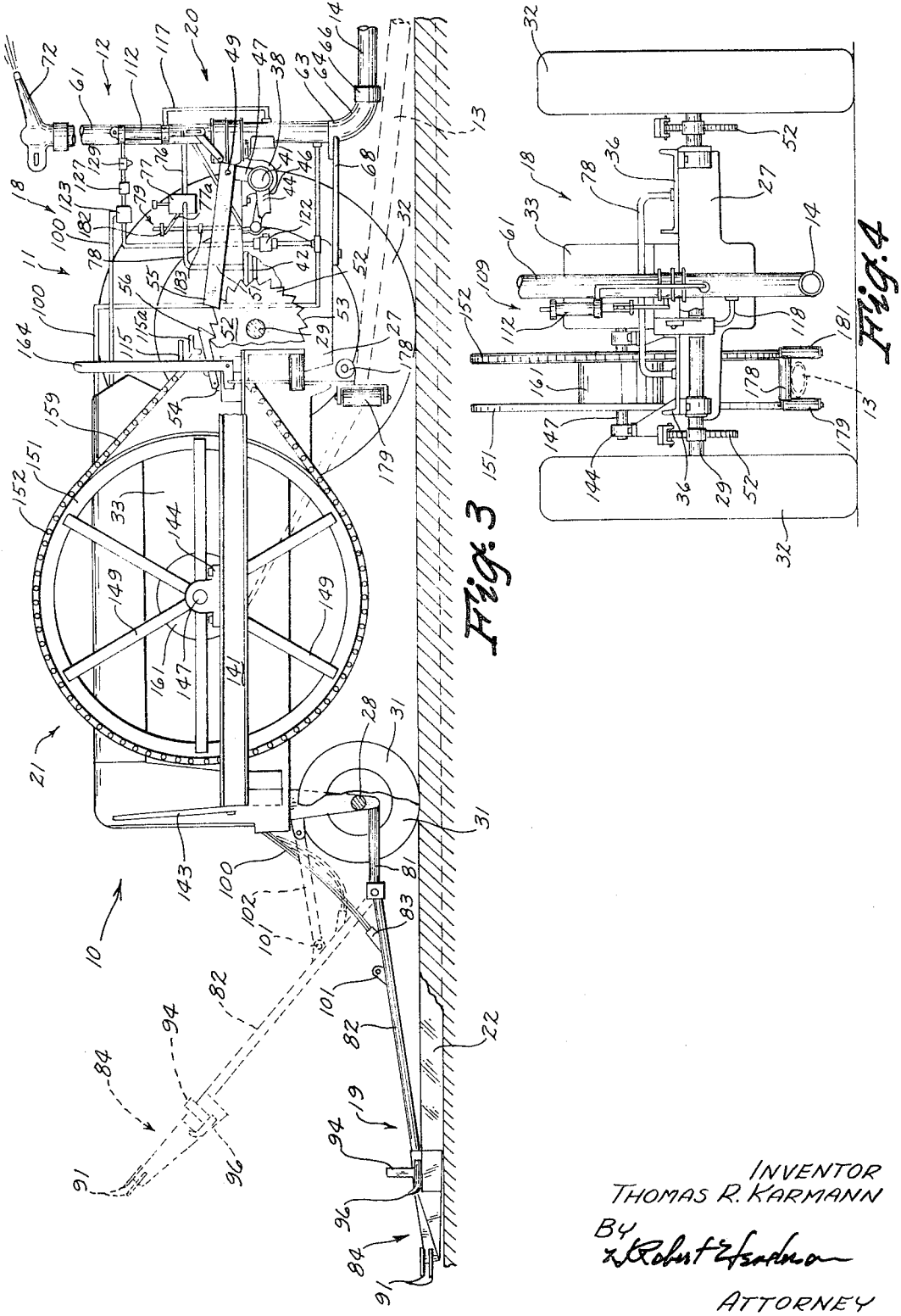

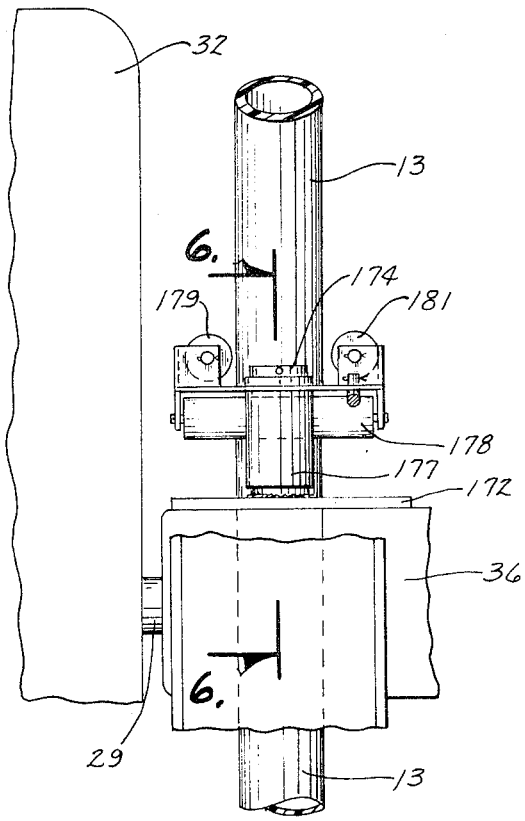
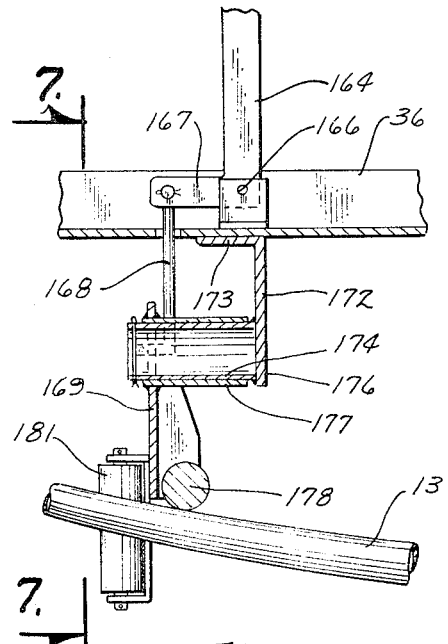
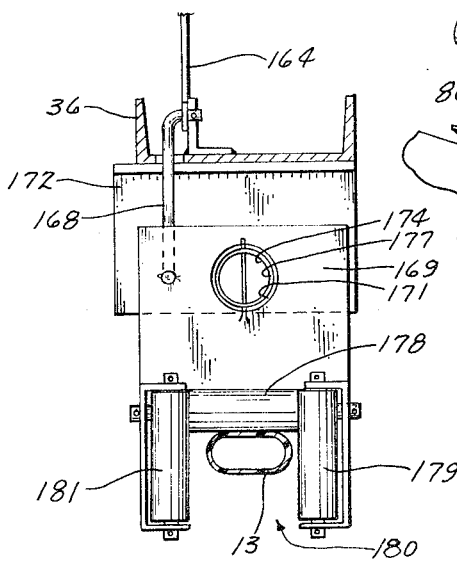
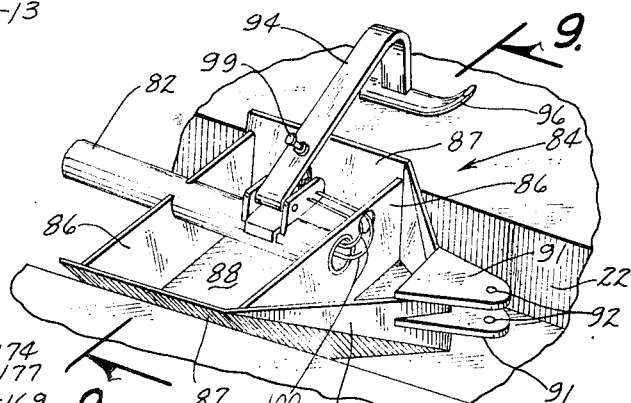

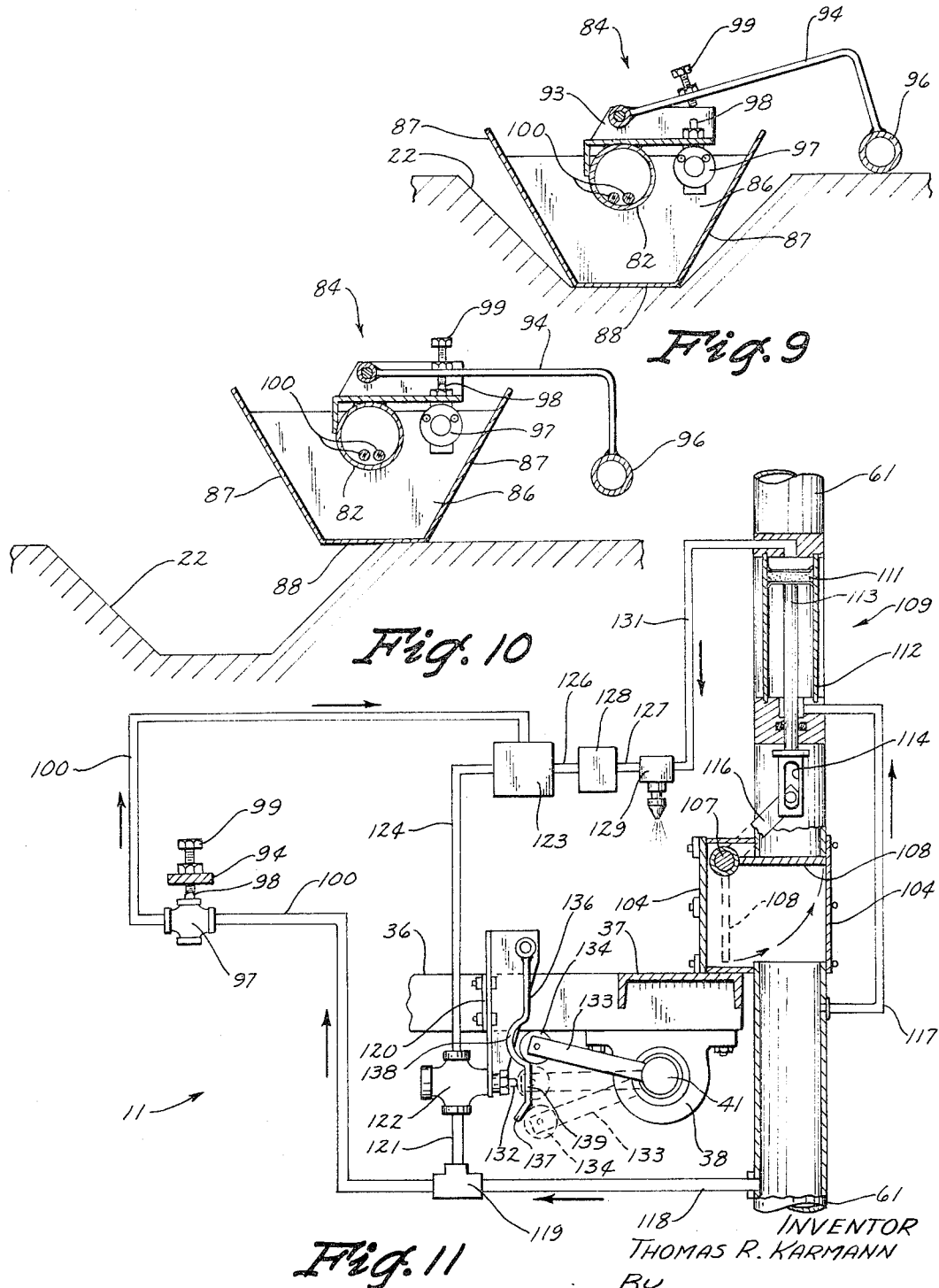

3,478,964
TRAVELING IRRIGATION SPRINKLER APPARATUS
Thomas R. Karmann, 6441 McKinley St.,
Omaha, Nebr. 68112
Continuation-in-part of application Ser. No. 569,159,
Aug. 1, 1966, now Patent No. 3,415,451. This application Oct. 31, 1967, Ser. No. 679,489
Int. Cl. B05b 3/18
U.S. Cl. 239—191    13 Claims

ABSTRACT OF THE DISCLOSURE

This invention pertains to a self-propelled traveling irrigation sprinkler apparatus which is mounted on a wheeled frame; the apparatus having a sprinkling unit operable to spray an area of land, a hydraulic mechanism operable to drive the wheeled frame, a furrow follower for guiding the wheeled frame along a preformed furrow which is operable to stop the flow of fluid to the sprinkling head and the hydraulic mechanism when the furrow follower leaves the furrow, a fluid pressure sensing device which is operable to stop the flow of fluid to the sprinkling head and the hydraulic mechanism in the event the hydraulic mechanism becomes inoperative, and a hose guiding device which is operable to assist an operator in winding the hose upon a reel mounted on the wheeled frame.

---

This application constitutes a continuation-in-part of my co-pending application Ser. No. 569,159, filed Aug. 1, 1966 now Patent No. 3,415,451.

BACKGROUND OF THE INVENTION

*Field of the invention*

This invention relates generally to a self-propelled traveling irrigation apparatus useable for agricultural irrigation of fields and the like.

*Description of the prior art*

In recent years, more and more emphasis has been placed on the successful development of sprinkler apparatus for particular use in the irrigation of agricultural fields. Replacing the conventional fixed sprinkler arrangement of a plurality of pipe sections coupled together, have been several successful portable apparatuses.

Among these apparatuses is a traveling irrigation apparatus which is self-propelled in a field so as to obviate the need for an attendant, and the rate of movement of which is in keeping with that rate most suitable for sprinkling, and which sprinkler utilizes the water for both propulsion and for irrigation purposes. The apparatus utilizes a flexible conduit, or hose, to convey a source of water under pressure from a fixed position to the movable spraying head during operation and to a hydraulic motor for operating the structure on which the spraying heads are carried.

In operation, a self-propelled sprinkler apparatus is connected by a hose to a water source under pressure with the hose extended away from the water source. The water is then turned on and the apparatus slowly propels its way toward the water source on a predetermined course as it irrigates the land within reach of its sprinkler heads. As the apparatus approaches the water source it pulls the hose behind it, thus causing the hose to loop back toward the end connected to the source. The apparatus passes the water source and continues on until it reaches a point wherein the hose is extended therefrom directly back to the water source. Continued travel by the apparatus would either cause the hose to part, or damage either the connection at the apparatus or the water source, thus stopping the flow of water thereto.

Several different stop devices have been incorporated into the apparatus for stopping the apparatus upon reaching the end of the field, however none of the known type have proved completely successful.

For example, one stop device, as described in U.S. Patent No. 3,085,751, utilizes an upstanding stop plate driven into the ground at the end of the path of travel. Slideably mounted on the apparatus is a rod which projects forward therefrom, which upon coming into contact with the stop plate shuts off a valve, thus stopping the flow of water to the apparatus. It has been found that during the irrigation process the ground becomes wet and the stop plate either falls over or is pushed over by the rod without stopping the flow of water. Also, as occasionally occurs, this apparatus wanders from its predetermined path of travel and upon reaching its maximum length of travel; as prescribed by the length of hose, does not find a stop plate to shut off the valve.

If the apparatus wanders from its predetermined path of travel, it and the trailing hose can very well damage or destroy a considerable amount of crops as the apparatus continues its movement, until it either reaches the maximum travelable distance due to the length of the hose or until an operator shuts down the water supply.

As revealed in U.S. Patent No. 3,235,009, in FIGS. 19 and 21, a stop device has been incorporated with the water source. Thus as the apparatus reaches the end of its path of travel, the hose, tied in with a rotatable valve mounted on the water source, swings around the water source and turns off the water supply. This device however provides no protection to crops if the apparatus should leave its predetermined course of travel.

Another problem created by a self-propelled traveling irrigation sprinkler apparatus is the possibility of flooding an area containing crops, in the event the self-propelling portion of the apparatus should malfunction. It is the purpose of these apparatuses once started, to leave them unattended until the cycle is completed. However, a malfunction can stop the forward movement of the apparatus but the sprinkling cycle continues in one spot until the water is shut off. Possible destruction of crops can readily occur by flooding, particularly if the malfunction occurs during the early stages of the irrigation cycle or if the operator remains away from the field for a considerable length of time, on the assumption that the apparatus is automatic, is functioning properly, and will shut down when the cycle is completed.

A problem also exists when, upon the completion of an irrigation cycle, it is necessary to wind the hose on a reel to enable the transportation of the apparatus to another furrow, field, or the like. In the past it has been necessary to maintain alignment of the reel with the hose to facilitate a proper winding thereof. If the reel is not in alignment with the hose, the hose will tend to climb up on the side of the reel during the winding process, thus causing frustration and difficulty as the winding process must be stopped, the miswound hose unreeled, and the winding process restarted.

SUMMARY OF THE INVENTION

It is, therefore, an object of this invention to provide a traveling irrigation sprinkler apparatus which is self-propelled in a field so as to obviate the need for an attendant, and the rate of movement of which is in keeping with that rate most suitable for effective sprinkling, and which sprinkler utilizes the water for both propelling itself and irrigation purposes, but wherein the apparatus is capable, when not connected to the source of water under pressure, of guided self-movement without the need of auxiliary equipment, such as a prime mover.

Another object of this invention is the provision of a traveling irrigation sprinkler apparatus as featured hereinbefore, which is capable of being operator driven so as to be self-moved from one furrow to another, from one field to another, to be backed and to be self-extricated, to have a highly desirable sharp turning radius, and importantly, to be useable as a prime mover.

A further object of this invention is to provide a self-propelled traveling irrigation sprinkler apparatus having a furrow follower which, upon leaving a predetermined path of travel or upon traveling a predetermined distance, is operable to shut down the water supply to the apparatus thus stopping the flow of water to the sprinkling head and to the propelling mechanism.

Another object of this invention is the provision of a shut-off device on a self-propelled traveling irrigation apparatus which is operable to stop the flow of water to the sprinkling head and the propelling mechanism in the event of a malfunction of the propelling mechanism.

It is a further object of this invention to provide a traveling irrigation sprinkler apparatus having a reel for transporting a hose and a hose aligning mechanism operably connected to the apparatus to assure the proper winding of the hose about the reel.

Still another object of this inveniton is the provision of a traveling irrigation sprinkler apparatus which automatically shuts down in the event of malfunction or if the apparatus should stray from its predetermined path thus preventing field and crop erosion, damage to the apparatus or physical damage to the crops.

Yet another object of this invention is the provision of a traveling irrigation sprinkler apparatus having a furrow follower, an automatic shut-off device and a hose aligning mechanism which is economical to manufacture, rugged in construction and extremely effective in use.

These objects, and other features and advantages of this invention will become more readily apparent upon reference to the following description when taken in conjunction with the accompanying drawings.

BRIEF DESCRIPTION OF THE DRAWINGS

FIG. 1 is a top plan view of a tractor with the irrigation sprinkling apparatus of this invention attached thereto, as it would appear while operating in a field;

FIG. 2 is an enlarged top plan view of the apparatus;

FIG. 3 is a cross sectional view taken along the line 3—3 in FIG. 2, and showing the majority of the apparatus in side elevation;

FIG. 4 is a rear elevational view of the apparatus;

FIG. 5 is an enlarged fragmentary top plan view of the apparatus showing the hose aligning mechanism;

FIG. 6 is a sectional view taken along the line 6—6 in FIG. 5;

FIG. 7 is a sectional view taken along the line 7—7 in FIG. 6;

FIG. 8 is a fragmentary perspective view of the furrow follower;

FIG. 9 is a sectional view taken along the line 9—9 in FIG. 8;

FIG. 10 is a fragmentary sectional view of the furrow follower, similar to FIG. 9, except with the prow of the furrow follower out of the furrow; and FIG. 11 is a fragmentary sectional view, partly in schematic, showing the shut-off device.

Referring now to the drawings, the irrigation sprinkler apparatus of this invention is indicated generally at 10 in FIG. 3; and includes a conventional tractor 11 or wheeled frame; a sprinkler unit 12 detachably mounted on the rear of the tractor 11; a length of hose 13 (FIG. 1), one end 14 (FIG. 3) of which is adapted to be connected to the sprinkler unit 12, and the other end 16 (FIG. 1) of which is adapted to be connected to a source of water 17 under pressure; a hydraulic device 18 (FIG. 3) operably connected to the tractor 11 and fluidly connected to the hose wherein it is operable in response to the application thereto of water under pressure for the propulsion of the tractor; a furrow follower unit 19 attached to the tractor 11 for guiding same; a shut-off mechanism 20 operatively connected to the furrow follower unit 19 and fluidly connected to the sprinkler unit and the hydraulic device; and a reel unit 21 rotatably mounted on the tractor and adapted to carry the hose 13.

The apparatus 10 is depicted in FIG. 1 under operating conditions in a field having a furrow 22 preformed therein by means conventionally used for such purpose, the furrow 22 used to guide the tractor 11 via the furrow follower unit 19 as described hereinafter. A valve 24, fluidly connected to an underground system 26 of water under pressure, such as a pipeline, is disposed adjacent the furrow 22 at the approximate longitudinal center thereof. The hose 13 is disposed with part 13a of the hose 13 adjacent to and in parallel relation to the furrow 22 and with the other part 13b thereof disposed in the furrow 22.

More specifically, the tractor 11 (FIG. 3) includes a frame 27, a front axle 28 and a rear or driving axle 29 mounted on the frame 27, a pair of front wheels 31 rotatably mounted on the front axle 28, a pair of rear wheels 32 mounted on the rear axle 29, a motor 33 operably connected through a transmission (not shown) to the rear axle 29, and a power take off 34 (FIG. 2) operatively connected to the motor 33 through the transmission.

The hydraulic device 18 (FIG. 4) includes a pair of transversely spaced, horizontally disposed channel plates 36 detachably secured to the frame 27 and disposed over the rear axle 29, wherein one of the plates 36 is positioned adjacent each rear wheel 32. An elongated cross member 37 (FIGS. 2 and 11), disposed rearwardly of and in parallel relation to the rear axle 29, rigidly interconnects the rear end of the plates 36. A pair of bearing mounts 38 are secured one to each underside of each of the plates 36 at the rear edge thereof. The mounts 38 are transversely aligned and rotatably receive an elongated shaft 41 extended through and laterally beyond the mounts 38.

Mounted on the underside of each of the plates 36 (FIG. 3) and depending therefrom is an expandable bellows-type actuator 42, which is fluidly connected at the top thereof to the sprinkler unit 12 as described hereinafter. One end (not shown) of an elongated rocker bar 44 is fastened to the bottom of each of the actuators 42 and the other end 46 thereof is secured, as by welding, to the shaft 41. A pair of transversely spaced links 47 are secured, as by welding, at a lower end thereof to the shaft 41, with the upper end thereof pivotally connected at 49 to a power arm 51 which extends over the plate 36 and toward the rear axle 29. A spring (not shown) or the like, mounted betwen each of the plates 36 and its corresponding rocker bar 44, biases each actuator 42 to a non-expanded position.

A pair of transversely spaced ratchet wheels 52 (FIGS. 3 and 4) are operably connected to the rear axle 29, by mounting thereto, with one ratchet wheel 52 disposed adjacent each rear wheel 32. A plurality of arcuately spaced teeth 53 are formed on the periphery of each of the ratchet wheels 52, and are drivingly engaged by the forward end 55 of each of the power arms 51. A bracket 54 (FIG. 2) is secured to the forward end of each plate 36, in alignment with each ratchet wheel 52. Pivotally mounted on each of the brackets 54 is a movable wheel stop 56 which engages the teeth 53 for preventing the rearward rotation of the ratchet wheel 52 (FIG. 3).

The sprinkler unit 12 (FIG. 3) includes an upstanding, elongated pipe 61 which is attached, as by bolts, to the member 37 intermediate the plates 36. A pair of struts 62 are secured on one end thereof to the pipe 61 above the member 37, and on the other end thereof to the plates 36, as best shown in FIG. 2, for supporting the pipe 61 in an upright position. Fluidly connected to the lower end of the pipe 61 (FIG. 3) is an elbow 63 having one end thereof projecting rearwardly of the tractor 11. A quick hose disconnect 66 is secured to the end 64, to receive the end 14 of the fluid hose. Attached to the outer surface of the elbow 63 is one end of a puller brace 68, with the other end thereof secured to the frame 27. Rotatably mounted on the upper end of the pipe 61 is a sprinkler gun 72. The gun 72 is a step-by-step rotary type actuated by an oscillating impulse arm (not shown) in a conventional manner.

A conduit 76 (FIG. 3) fluidly interconnects a poppet valve 77 to the pipe 61. A pair of second conduits 78 are fluidly attached to the poppet valve 78 with each fluidly interconnecting one of the actuators 42 thereto. The poppet valve 77 is operably connected to the shaft 41 by a mechanical linkage 79, the operation thereof to be described hereinafter.

The furrow follower unit 19 (FIG. 3) includes a bar 81 detachably mounted to the front axle housing and extending forward therefrom. An elongated hollow beam 82 is pivotally mounted to the bar 81, wherein only vertical movement of the hollow beam 82 is possible, while horizontal displacement is prohibited. Secured to the rear end of the beam 82 and near the pivot connection to the bar 81 is a short hollow extension rod 83, the interior of which communicates with the interior of the hollow beam 82.

Rigidly connected to the forward end of the beam 82 is a guiding prow 84 (FIGS. 8 and 9) having a pair of substantially U-shaped, longitudinally spaced end plates 86 secured to the beam 82, a pair of spaced apart side plates 87 secured to the sides of the end plates, and a bottom plate 88 secured to the bottom edges of the end plates 86 and side plates 87. A V-shaped nose piece 89 secured to the forward end plate 87, has a pair of forwardly projecting, vertically spaced, hitch arms 91 each having vertically aligned holes 92 formed therein adapted to receive a travis pin (not shown), in event it is desired to tow the apparatus 10. It would be noted that the undersurface of the guiding prow 84 is substantially shaped in the form of a furrow as best noted in FIG. 9.

Secured to the top of the beam 82, intermediate the end plates 86, is a mounting bracket 93. Pivotally mounted on one end thereof to the bracket 93 is an L-shaped shut-off arm 94 which extends to one side of the prow 84. On the free end of the shut-off arm 94 is a shoe 96 which is adapted to slide along the top of the ground off side the furrow 22 (FIG. 9). A normally closed pilot valve 97 is secured to the mounting bracket 93 immediately below the shut-off arm 94. The pilot valve 97 has a plunger 98 mounted therein which is operable, on being pushed into the pilot valve 97, to open same. An adjusting screw 99 is reciprocally fastened to the shut-off arm 94 in vertical alignment with the plunger 98, for the purpose of adjusting the action of the plunger.

Fluidly connected to the pilot valve 97 (FIG. 8) are a pair of fluid hoses 100 which lead from the pilot valve 97, through the forward end plate 86, into the forward end of the beam 82 and therethrough to the extension rod 83. Fastened to the top of the beam 82 (FIG. 3), forward of the extension rod 82, is an upstanding holding boss 101, adapted to be secured to one end of a detachably mounted holding bar 102, the other end of which is secured to the front of the tractor 11. While transporting the tractor, when the furrow follower 19 is not required to guide same, the beam 82 can be manually pivoted to a transport position, as shown in broken line in FIG. 3, and secured to the holding bar 102 at the boss 101, thus holding the guiding prow 84 off the surface of the ground.

The shut-off mechanism 20 (FIG. 11) includes a valve box 104 fluidly interposed in the pipe 61 and supported by the member 37. The box 104 has a removably attached door 106 secured to one side thereof and forming one wall thereof, for the purpose of entry for adjustment or repair. Pivotally mounted on a pin 107, secured within the box 104, is a flap valve 108 operatively connected to a valve mechanism 109 (FIGS. 4 and 11) mounted along side the pipe 61.

The valve mechanism 109 (IFG. 11) includes a two way reciprocating, pressure differential cylinder 111 enclosed in a fluid tight cylinder housing 112. Secured to the cylinder 111 and depending therefrom is a cylinder rod 113 having an elongated slot 114 formed in the free end thereof. A valve arm 116 is secured on one end thereof to the end of the flap valve 108 mounted on the pin 107, and having its free end slidably mounted, as on a stud, in the slot 114. Movement of the cylinder 111 from the top of the housing cylinder 112, to the bottom thereof causes said valve arm 116 to pivot, in a clockwise manner about the pin 107 thus causing the flap valve 108 to pivot from its closed, horizontal, position, as shown in full line in FIG. 11, to an open, vertical, position, as shown in broken line. The slot 114 is provided to prevent a fluttering action of the flap valve 108.

Fluidly connecting the pipe 61, upstream of the flap valve 108, to the bottom of the cylinder housing is a fluid line 117 (FIG. 11). A first conduit 118 is also fluidly connected on one end thereof to the pipe 61, upstream of the flap valve 108, and on the other end thereof to a T 119. A second conduit 121 is fluidly connected between the top of the T 119 and an oscillating valve 122 secured by a depending holding bracket 120 bolted to the plate 36. Fluidly connecting the oscillating valve 122 to a shut-off valve 123 is a third conduit 124. A fourth conduit 126 fluidly connects the shut-off valve 123 to a check valve 128 which in turn is connected by a fifth conduit 127 to a drain orifice 129. The drain orifice is fluidly connected to one end of the conduit 131, the free end of which is fluidly connected to the top side of the cylinder housing 112. Fluidly interconnecting the T 119 and the shut-off valve 123 are the hoses 100 coming from the pilot valve 97 disposed on the guiding prow 84.

The normally closed oscillating valve 122 (FIG. 11) has a reciprocating plunger 132 mounted thereto which is operable, on being depressed, to open the valve 122, thus allowing the flow of fluid therethrough. An oscillating arm 133 is secured on one end thereof to the elongated shaft 41 and having its free end extending toward the reciprocating plunger 132. Mounted on the free end of the oscillating arm 133 is a roller 134. A depending resilient valve actuator plate 136, secured on one end of the side of one of the plates 36 and having its free end 137 disposed between the plunger 132 and the roller 134, is biased toward the roller.

The actuator plate 136 (FIG. 11) has an offset 137 integrally formed on the free end thereof and an arcuate offset bend 138 formed intermediate the ends thereof, thus leaving a vertically disposed flat area 139 between the offset and the bend. It will be observed that the offset 137 and the bend 138 extend away from the roller 134. Therefore, upon oscillation of the roller 134, as caused by oscillation of the shaft 41, the roller moves from the arcuate bend 138, as shown in full line view, across the flat area 139, thus forcing the actuator plate 136 to depress the plunger 132, as shown in broken line view, to the offset bend 137, wherein the plunger 132 returns to its normal position, also shown in broken line view. This reciprocating movement of the plunger 132 causes a cyclical on-off action of the valve 122 wherein water is allowed to flow therethrough only when the roller 134 is moving across the flat area 139 of the actuator plate 136. In event the hydraulic device 18 malfunctions, the spring biasing the actuator 42 to a non-expanded position, as described hereinbefore, causes the shaft 41 and the arm 133 to rotate in a clockwise direction thus causing the roller 134 to move to the arcuate bend 138 as shown in full line view in FIG. 11, wherein the plunger 132 is in a normal position and the oscillating valve 122 is closed. Closure of the oscillating valve 122 causes the flap valve 108 to close thus stopping the flow of water to the hydraulic device 18 and the sprinkler unit 12, as described hereinafter.

The reel unit 21 (FIGS. 2 and 3) is spaced from and disposed parallel to the motor 33 and includes a horizontally disposed support beam 141 connected at the front end thereof by a member 142 to the front of the frame 27, and at the rear end thereof to the frame 27, at the rear axle 29. The member 142 is supported by a brace 143 attached between the member 142 and the top of the frame 27.

Axle bearing mounts 144 and 146 (FIG. 2) are disposed intermediate the longitudinal axis of the motor 33, with one of the mounts 144 mounted on the support beam 141 and with the other mount 146 mounted on the frame 27, wherein the mounts are transversely, axially aligned. A reel axle 147, rotatably mounted in, and extending between the mounts 144 and 146, supports a hub (not shown) having a plurality of arcuately spaced spokes 149 (FIG. 3) extending radially therefrom which are secured on both sides of the hub, thus forming a pair of spaced parallel flanges. The outer end of the spokes 149, on each side of the hub, terminate at rings 151 and 152 welded thereto. The ring 152, adjacent the motor, has a plurality of chain engaging teeth 153 formed on the periphery thereof.

Mounted on the frame 27, above the plate 36 is a hydraulic motor 154 (FIG. 2) which is fluidly connected by hydraulic lines 156 and 156a to the hydraulic system (not shown) of the tractor 11. The hydraulic motor 154 powers a sprocket wheel 157 having chain engaging teeth formed thereon. The ring 152 and the wheel 157 are interconnected by a chain 159, and upon energization of the motor 154 the hub is caused to rotate. A second hub 161, spaced radially from the hub and disposed between the spokes 149, is provided for winding the hose 13 thereabout. An opening 162 (FIG. 2) is formed in the second hub 149 for the purpose of inserting end 14 of the hose 13 therein, thus holding the hose end 14 to facilitate the winding of the hose 13 about the second hub 161.

A yoke assembly 163 (FIG. 2), mounted on the plate 36 for the purpose of guiding the hose 13 to the second hub 161 (FIG. 2) and between the rings 151 and 152, includes an upstanding L-shaped lever arm 164 (FIG. 6) pivotally mounted on the plate 36 by a pivot pin 166. The outer end of the short leg 167 of the lever arm 164 is pivotally connected to a link 168 having its free end depending therefrom. A roller holding frame 169 (FIG. 7) secured off center to the free end of the link 168, has an opening 171 formed in the lateral center thereof. An angle iron 172 (FIG. 6), secured on one leg 173 thereof to the bottom of the plate 36, has an outstanding pipe 174 welded to the free leg 176 of the iron 172. Pivotally mounted on the pipe 174 is a second pipe 177 which is also secured in the opening 171 to the frame 169. A horizontally disposed roller 178 is rotatably attached to the back side of the frame 169 and depends therefrom. Two vertically disposed transversely spaced rollers 179 and 181 are rotatably mounted one on each side of the horizontal roller 178 forward of the frame 169 thus forming a U-shaped bracket 180 adapted to rollerably receive the hose 13. It will be noted in FIGS. 3 and 5 that the U-shaped bracket 180 is disposed below and forward of the axle 29.

For the proper operation of the apparatus 10, the field to be irrigated must be prepared for optimum operation. The pipe line 25 (FIG. 1) should be laid under the surface the length of the field and fluidly connected to a source of water under pressure. A plurality of furrows 22 should be formed laterally of the pipe and terminated within the field and from the edges thereof a distance equal to the distance that the sprinkling gun can effectively cover, with adjacent furrows preferably spaced from each other a distance equal to twice the distance that the sprinkling gun can effectively cover. Adjacent each furrow as it crosses the pipe 25 is the valve 24 which is fluidly connected to the pipe, the location to be such so as not to obstruct the travel of the tractor 11.

In operation, the apparatus 10 is mounted, with the furrow follower unit 19 pivoted to a transport position, and the tractor 11, under its own power, is driven to the field to be irrigated. The tractor 11 (FIG. 1) is preferably driven to the longitudinal center of the field, immediately adjacent to or over one of the valves 24. The valve 24 has a quick hose disconnect (not shown) mounted thereon, to which one end 16 of the hose 13 is connected. The tractor 11 is then driven to an end of the furrow with the hose 13 unreeling along the side of the furrow 22. At that end, the tractor is positioned with the furrow follower beam 82 horizontally disposed, the guiding prow 84 disposed in the furrow, and the tractor facing the opposite end of the furrow 22. The other end 14 of the hose 13 is connected to the quick hose disconnect 66 located on the sprinkler unit 12.

The valve 24 (FIG. 1) is opened and water under pressure flows through the hose 13 to the elongated pipe 61 located on the tractor 11. The water flows through the pipe 61 (FIG. 3) and to the gun 72 from which its emission causes the gun 72 to rotate about a 360° circle by the water pressure, thus sprinkling a considerable circular area of the field with water 181 as best noted in FIG. 1.

The water simultaneously flows into and through the conduit 76, the poppet valve 77, and the second conduit 78 into the actuators 42. At the same time water flows into the shut off mechanism 20 and to the pilot valve 97, as hereinafter described. The water pressure causes the actuators 42 to expand thus effectuating a downward pivotal movement of the bars 44. This movement of the bars 44 causes a counterclockwise partial rotation of the shaft 41, as viewed in FIG. 3, which in turn effectuates a forward movement of the power arms 51 by the transfer of the rotational force through the linkake 47. The movement of the power arms 51, is engagement with a tooth 53 of each rachet wheel 52 effectuates a partial rotation of the wheel 52 and the axle 29, thus causing the tractor to be propelled in a forward direction. The wheel stop 56 pivots upwardly, allowing the rachet wheel to rotate and then engages a tooth thereof to prevent counter rotation thus effectively preventing a rearward movement of the tractor.

Also, upon rotation of the shaft 41 (FIG. 3) the mechanical linkage 79 is lowered, whereby a trip stop 182 engages an arm 77a of the valve 77, closing the valve 77 to the flow of water therethrough. When the complete expansion of the actuators 42 are accomplished, the water therein is allowed to escape therefrom through a pressure release valve (not shown). The actuators 42 then contract to their original positions, shown in full line in FIG. 3, by the action of the biasing springs, with an accompanying return movement of the arms and linages associated therewith and a clockwise partial rotation of shaft 41. The poppet valve 77 is opened by the trip valve 183 and the cycle recommences.

It is obvious that the forward movement of the tractor is barely perceptible, thus allowing for adequate irrigation of the field. The tractor pulls the hose 13 along and continues until it reaches the opposite end of the furrow 22.

A function of the shut-off mechanism (FIG. 11) 20 and the furrow follower unit 19 is to stop the flow of water to the hydraulic device 18 and the sprinkler unit 12 in event the tractor leaves its predetermined path, the hydraulic device malfunctions, or the tractor reaches the end of the furrow, thus preventing field and crop erosion, damage to the hose or hose connections, damage to the tractor or apparatus, or damage to crops.

In operation, when the hose 13 is connected to the water source and the apparatus, water enters the shut-off mechanism through the conduit 118, to the downstream side of the cylinder 111 through the oscillating valve 122, the shut-off valve 123, the check valve 128 and the drain orifice 129, and through fluid line 117 to the upstream side of the cylinder 111, thus providing substantially equal water pressures on both sides of the cylinder. The drain orifice 129, having a small orifice, does not substantially effect the downstream water pressure at the cylinder. With equal or substantially equal pressures on both sides of the cylinder, the cylinder 111 is depressed in the cylinder housing thus maintaining the flap valve 108 in an open position as shown in FIG. 11 in broken line view, and water is allowed to flow to the sprinkling gun 72 and the hydraulic device 18 (FIG. 3).

As long as water is allowed to surge through the oscillating valve 122, sufficient water pressure exists at the shut-off valve 123 to hold the flap valve 108 in an open position. In event the hydraulic device malfunctions, the oscillating valve 122 closes and the surge pressures created at the downstream end of the cylinder 111 decrease by the action of the drain orifice 129 and cause the cylinder 111 to move to a closed position, as shown in FIG. 11, thus closing the flap valve 108. The action of the cylinder in closing forces the water in the cylinder back through the sixth conduit 131 to the drain orifice 129, wherein the water is expelled from the shut-off mechanism 20. The check valve 128 prevents the back flow of water from the cylinder to feed back into the shut-off valve.

The cyclical action of the oscillating valve 122 causes a reciprocating action in the cylinder 111 due to the discharge of water through the drain orifice 129. However, the reciprocating action of the cylinder is not transmitted to the flap valve 108 because of the slot 114.

The shut-off valve 123 (FIG. 11), also fluidly connected by hose 100 to the pilot valve 97, is operable upon flow of water thereto from the hose 100 to also close, thus causing the flap valve 108 to close. Therefore, when the guiding prow 84 (FIG. 9) strays from the furrow 22, or reaches the end of the furrow 22, the shoe 96 which slides off side the furrow, falls from a position relative to the pilot valve 97 as shown in FIG. 9 to a position as shown in FIG. 10 and causes the adjusting screw 99 to depress the plunger 98, thus causing the pilot valve 97 to open. If it is desired to effectuate an early shut off of the pilot valve, the adjusting screw 99 is screwed into the arm; if later shut off is required, the screw is retracted.

Upon completion of the irrigation cycle, as described hereinabove, the valve 24 is manually closed and the hose 13 is disconnected from the sprinkler unit 12 and the valve 24. End 14 of the hose is placed in the opening 162 of the hub 161 with the traveling hose 13 disposed between the rollers 178, 179 and 181 and extending rearwardly of the tractor, as shown in broken line view in FIGS. 3 and 4. Energization of the hydraulic motor 154 causes the hose 13 to be wound about hub 161. If the hose 13 does not trail directly behind the reel, the operator can pivot the lever arm 164 either forward or backward about the pin 166, thus causing the bracket 180 formed by the rollers to arcuately move about the pipe 174 and, therefore, guiding the hose 13 to the exact center of the reel.

Although a preferred embodiment of this invention has been disclosed and described hereinbefore, it is to be remembered that various modifications and alternate constructions can be made thereto without departing from the true spirit and scope of the invention as defined in the appended claims.

I claim:

1. A traveling irrigation sprinkler apparatus for attachment to a wheeled frame having a driving axle, the apparatus comprising:
   sprinkler means adapted for attachment to the wheeled frame and operable in response to the application thereto of fluid under pressure;
   a length of hose, one end of which is adapted to be connected to said sprinkler means and the other end of which is adapted to be connected to a source of fluid under pressure;
   hydraulic means adapted to be carried by the wheeled frame and operably connected to the driving axle for rotating same thus propelling the wheeled frame, said hydraulic means fluidly connected to said hose and operable in response to the application thereto of fluid under pressure;
   furrow follower means detachably mounted on the wheeled frame and operable to guide same along a preformed furrow; and
   shut-off means operatively connected to said furrow follower means and fluidly interconnected between said hose one end and said sprinkling means and said hydraulic means, said shut-off means operable in response to movement of said furrow follower means out of the furrow to shut off the supply of fluid to said sprinkling means and said hydraulic means.

2. A traveling irrigation sprinkler apparatus as defined in claim 1 wherein said furrow follower means includes; a beam pivotally connected on one end thereof to the wheeled frame; a furrow engaging guiding prow connected to the other end of said beam and operable to ride in the furrow; and a shut-off arm pivotally connected on an end thereof to said prow with the other end thereof extending to one side of said prow and adapted to ride on top of the ground off side the furrow, said shut-off arm operatively connected to said shut off means and, upon movement of said prow out of the furrow, operable to shut off the supply of fluid to said sprinkling means and said hydraulic means.

3. A traveling irrigation sprinkler apparatus as defined in claim 1 wherein said shut-off means includes; a fluid line fluidly connected on one end thereof to said hose and on the other end thereof to said sprinkling means and said hydraulic means; a valve movable between opened and closed positions interposed in said fluid line; a valve mechanism connected to said valve for effectuating movement of said valve from said opened position to said closed position, said valve mechanism fluidly connected on the upstream end thereof to the upstream end of said fluid line; a conduit fluidly connected on one end thereof to said upstream end of said fluid line and on the other end thereof to the downstream end of said valve mechanism; a shut-off valve interposed in said conduit and operatively connected to said furrow follower means; and pressure relieving means interposed in said conduit downstream of said shut-off valve; said shut-off valve, in conjunction with said pressure relieving means, operable in response to movement of said furrow follower means out of the furrow to cause a fluid pressure differential between said upstream end and said downstream end of said valve mechanism for effectuating movement of said valve.

4. A traveling irrigation sprinkler apparatus as defined in claim 3, including a fluid hose having one end thereof fluidly connected to said conduit upstream of said shut-off valve and having the other end thereof connected to said shut-off valve, and a normally closed pilot valve interposed in said fluid hose and mounted on said furrow follower means whereupon movement of said furrow follower means out of the furrow causes said pilot valve to open, said shut-off valve operable in response to fluid flowing thereto from said fluid hose.

5. A traveling irrigation sprinkler apparatus as defined in claim 4, wherein said furrow follower means includes a beam pivotally connected on one end thereof to the wheeled frame; a furrow engaging guiding prior rigidly connected to the other end of said beam and operable to ride in the furrow; and a shut-off arm pivotally connected on an end thereof to said prow with the other end thereof extending to one side of said prow and adapted to ride on top of the ground off side the furrow, said shut off arm operatively connected to said pilot valve, whereupon, on movement of said prow out of the furrow said shut-off arm operatively opens said pilot valve.

6. A traveling irrigation sprinkler apparatus as defined in claim 5 including oscillating means operatively connected to said hydraulic means and interposed in said conduit upstream of said shut-off valve, said oscillating means operable in response to non-movement of said hydraulic means to effectuate operation of said shut-off valve thus causing a fluid pressure differential between said upstream end and said downstream end of said valve mechanism.

7. A traveling irrigation sprinkler apparatus as defined in claim 6 wherein said oscillating means includes a normally closed oscillating valve movable from an off position to an on position in response to movement of said hydraulic means, an arm pivotally connected on one end thereof to said hydraulic means and having the other end thereof operatively communicable with said oscillating valve wherein movement of said hydraulic means causes said arm to cyclically engage said oscillating valve, thus causing a cyclical off-on movement of said oscillating valve, and wherein said valve mechanism includes non-fluttering means connected to said valve to prevent fluttering thereof due to said cyclical off-on movement.

8. A traveling irrigation sprinkler apparatus as defined in claim 7 wherein said valve mechanism includes a fluid tight cylinder housing disposed adjacent said fluid line wherein the upstream end of said housing is fluidly connected to said upstream end of said fluid line and the downstream end of said housing is fluidly connected to said other end of said conduit, and a reciprocating cylinder disposed in said cylinder between said upstream end and said downstream end of said housing, said cylinder movable in response to a fluid pressure differential between said upstream end and said downstream end of said housing, said cylinder operatively connected to said valve for effectuating movement thereof.

9. A traveling irrigation sprinkler apparatus as defined in claim 8 including a check valve fluidly connected to said conduit between said shut-off valve and said housing for preventing a reverse flow of fluid into said shut-off valve, and said pressure relieving means includes a drain orifice interposed in said conduit between said check valve and said housing thus allowing the fluid in said downstream end of said housing to flow therefrom.

10. A traveling irrigation sprinkler apparatus for attachment to a wheeled frame having a driving axle, the apparatus comprising:
sprinkler means adapted for attachment to the wheeled frame and operable in response to the application thereto of fluid under pressure;
a length of hose, one end of which is adapted to be connected to said sprinkler means and the other end of which is adapted to be connected to a source of fluid under pressure;
hydraulic means adapted to be carried by the wheeled frame and operably connected to the driving axle for rotating same thus propelling the wheeled frame, said hydraulic means fluidly connected to said hose and operable in response to the application thereto of fluid under pressure;
furrow follower means detachably mounted on the wheeled frame and operable to guide same along a preformed furrow; and
oscillating means operatively connected to said hydraulic means and fluidly interconnected between said hose one end and said sprinkler means and said hydraulic means, said oscillating means operable in response to non-movement of said hydraulic means to cause a fluid pressure differential in said oscillating means which shuts off the supply of fluid to said sprinkler means and said hydraulic means.

References Cited

UNITED STATES PATENTS

| | | | |
|---|---|---|---|
| 2,880,937 | 4/1959 | King | 239—181 |
| 2,883,116 | 4/1959 | Muerch | 239—191 |
| 3,009,645 | 11/1961 | Nugent | 239—179 |
| 3,047,236 | 7/1962 | Fahrner | 239—179 |
| 3,085,751 | 4/1963 | Warrick et al. | 239—191 |
| 3,415,451 | 12/1968 | Karmarr | 239—197 |

ROBERT B. REEVES, Primary Examiner

N. L. STACK, JR., Assitant Examiner